(12) United States Patent
Swanson

(10) Patent No.: US 6,622,939 B2
(45) Date of Patent: Sep. 23, 2003

(54) APPARATUS FOR APPLYING LIQUID FERTILIZERS AND PESTICIDES USING A DUAL STAGE VARIABLE RATE DISTRIBUTION MANIFOLD

(75) Inventor: Guy J Swanson, Spokane, WA (US)

(73) Assignee: Exactrix Global Systems, Spokane, WA (US)

( * ) Notice: Subject to any disclaimer, the term of this patent is extended or adjusted under 35 U.S.C. 154(b) by 37 days.

(21) Appl. No.: 09/916,890

(22) Filed: Jul. 26, 2001

(65) Prior Publication Data
US 2002/0000476 A1 Jan. 3, 2002

Related U.S. Application Data

(63) Continuation of application No. 09/241,663, filed on Feb. 1, 1999, now abandoned.

(51) Int. Cl.$^7$ ................................................ B05B 1/20
(52) U.S. Cl. .................... 239/159; 239/76; 239/172
(58) Field of Search ...................... 239/76, 159, 172; 137/115.28, 115.01, 601.2, 601.21, 119.01; 91/468

(56) References Cited

U.S. PATENT DOCUMENTS 5,331,882 A * 7/1994 Miller ...................... 91/461

OTHER PUBLICATIONS

Rich Fee, New NH$_3$ manifolds do better, Successful Farming, Jan. 2003, pp. 46–48.

P.M. Boyd et al., Field com tests to examine anhydrous ammonia manifold variability, paper presented at 2002 ASAE Annual International Meeting, Jul. 28–31, 2002.

P.M. Boyd et al., Field evaluation of anhydrous ammonia performance and variability, paper presented at 2002 ASAE Annual International Meeting, Jul. 28–31, 2002.

H.I. Fraser, The Trangle Rotaflow—Anhydrous ammonia distribution technology, product information from H.I. Fraser Pty Ltd web site, printed from http://www.hifraser.com/Images&files/pdffiles/rotaflow.PDF in Feb. 2003.

H.I. Fraser, The Trangle Rotaflow—Anhydrous ammonia distribution technology, product information from H.I. Fraser Pty Ltd web site, printed from http://www.hifraser.com/Images&files/pdffiles/nh3specs.PDF in Feb 2003.

* cited by examiner

Primary Examiner—Michael Mar
Assistant Examiner—Christopher Kim
(74) Attorney, Agent, or Firm—Hovey Williams LLP

(57) ABSTRACT

An improved liquid fertilizer distribution manifold operating in two stages. An accumulator piston located above the primary and secondary ports provides for two stages of flow. A broad range of regulated flow for site-specific farming results in precise, accurate and timely application of liquid fertilizer and pesticides. An elevated piston seal flange in the manifold allows flow to be exact with plugged or partially plugged primary orifices. Manifolds are produced in single tier and double tier arrangements to improve efficiency. The same manifold can be applied to NH3 pressure increasing systems. NH3 pressure decreasing systems and liquid fertilizer and pesticide systems.

55 Claims, 8 Drawing Sheets

KEY, FIRST STAGE OF DUAL STAGE MANIFOLD:
SUPPLY PRESSURE BELOW ACCUMULATOR CHARGE PRESSURE ——▷
REDUCED PRESSURE AND METERED FLOW AFTER PRIMARY PORTS ------▷

KEY, SECOND STAGE OF DUAL STAGE MANIFOLD:
SUPPLY PRESSURE ABOVE ACCUMULATOR CHARGE PRESSURE →

APPARATUS FOR APPLYING LIQUID FERTILIZERS AND PESTICIDES USING A DUAL STAGE VARIABLE RATE DISTRIBUTION MANIFOLD

RELATED APPLICATIONS

This is a continuation of application Ser. No. 09/241,663 filed Feb. 1, 1999 now abandoned, which is incorporated by reference herein.

BACKGROUND

1. Field of Invention

This invention relates to improvements in the precise application of liquid fertilizers and pesticides on agricultural fields at very low flow rates and at normal flow rates. Site specific, variable rate application is improved. The present dual stage manifold invention is an improvement over the type of single stage $NH_3$ accumulator manifold shown in my pending patent, Ser. No. 09/173,442 filed Oct. 14,1998. This new invention is effective with all types of liquid fertilizers including $NH_3$ and pesticides.

2. Description of Prior Art $NH_3$ or anhydrous ammonia is the basic building block for all commercial fertilizers used in the United States. Urea, Ammonium Nitrate, Ammonium Phosphate, Calcium Nitrate, URAN, Aqua Ammonia, Ammonium Sulfate, and Ammonium Phosphate Sulfate are all produced with the base stock, Anhydrous Ammonia. 80% of the U.S. domestic consumption of $NH_3$ was used for fertilizer. The U.S. also imports ammonia with a net import reliance of 20% (USGS, Nitrogen Fixed—Ammonia).

$NH_3$ is priced at about ½ the cost of the liquid and dry sources of nitrogen. Utilizing $NH_3$ as the primary source of nitrogen results in the lowest cost of production historically. The 20 -year average has been 6 to 8 cents per pound of Nitrogen less than Urea. An average savings of 6 to 8 dollars per acre in the northern Great Plains (NDSU Extension, Urea Price Drop, Franzen).

Approximately 85% of the $NH_3$ is consumed in the Midwestern cornbelt at 4,000,000 tons annually. The Pacific states consume about 220,000 tons annually.

Nitrogen based liquid fertilizers have recently come under tough scrutiny by the EPA. Nitrate levels in rivers and streams can be traced to over application and misuse of the nitrogen input (See USGS, National Water Quality Assessment Program). Drinking water in Midwestern states is severely contaminated with nitrate levels up to 25 times above the national recommended maximum level. Some states such as Iowa have been quite active in reducing the applied rates of nitrogen fertilizer to improve the environment and provide better economic returns for farmers (See the enclosed documents, Environmental Working Group, Pouring It On, Solving the Nitrate Problem. February 1996).

New techniques for applying nitrogen to improve the environment and the economic returns for farmers are being implemented by industry leaders (see Dealer & Applicator, December 1998, page 18,19). Global positioning, variable rate, site-specific application is being practiced with varying results. A field map of a variable rate, site-specific application of nitrogen has rates that vary from 20 lbs. N/acre to 200 lbs. N/acre (See Hunt Brothers Field Map, Fall 1998, Blakinsville, Ill. enclosed). Scientists at the USDA-ARS (see Site-Specific Application of Nitrogen Fertilizer for Maize Production) have determined no benefits from variable rate, site-specific application. The application equipment presently utilized in these tests is not accurate or exact causing erroneous results.

The result of using poor application equipment is shown in a report by Alfred Blackmer of Iowa State University (See Successful Farming, September 97, Streaks Define Misapplication of N, Rich Fee, Crops and Soils Editor). Yield reductions occur in corn because N bands are placed on 30-inch spacing. Thus the growing crop can be starving over a width of five feet and the next adjoining five-foot strip can easily have two times more applied N than required.

Over the years the solution for many agronomists was to simply raise the applied N rate until the field reached Maximum Economic Yield (MEY). Since the applied nitrogen bands have as much as a four times applied rate variance between shanks it has become an opportunity to improve liquid fertilizer application. With precise accurate application of applied nitrogen less applied N is required to reach a new yield threshold. Maximum Economic Yield (MEY) is improved due to application equipment that has exact port to port accuracy, target timing, and a field rate reduction of applied N.

The lowest cost form of N is $NH_3$. The material is applied on a wide expanse of acres in the United Sates, estimated to be as high as 100 million acres per year. A 10% reduction in its use would save 200 million dollars per year. A yield increase of just 5 bushels would result in an increase of farm revenues of 1 billion dollars per year. Reaching top efficiency of nitrogen application could result in cost savings to the environment of billions of dollars. Low commodity prices seldom represent the true cost of production to consumers.

Agricultural crop production is sometimes regarded as a form of mining, taking nutrients from the soil in short rotations. This means nutrients must be added back with elements mined from deep natural gas wells, phosphate and potash ores and even metal mines for zinc. The mystery is how to add back the basic nutrients without damaging the quality of the surface water or the water wells.

As the conundrum of proper NPK input evolves it has become apparent the application machinery can be improved substantially. New techniques such as variable rate, site specific, satellite referenced (GPS) input application are being implemented (See Fertilizer Management for Today's Tillage Systems, Potash and Phosphate Institute, Atlanta, Ga.).

An area of special concern is the actually measured accuracy of the nitrogen bands or lineal band concentration. Iowa State University and Successful Farming have released results from testing manifolds used to distribute $NH_3$ to the lineal bands. Their discoveries are alarming to many industry and environmental groups. Articles published in Successful Farming indicate $NH_3$ production manifolds are grossly inaccurate (See three issues of Successful Farming, September 97, November 97, September 98, the articles are: Outdated Manifolds Sabotage Nitrogen Application, Streaks Define Misapplication of N, New Nitrogen Manifold Promises Precision, all articles September 97, Here's How to Calibrate $NH_3$ Applicators, November 97, Taking Nitrogen Calibration To the Field, September 98, all articles authored by Rich Fee, Crops and Soils Editor).

Iowa State researchers Mark Hanna, and Michael White in their paper, Field Variability of Anhydrous Ammonia Distribution through Different Manifold Styles report that some shanks apply 3 to 4 times more $NH_3$ than adjoining shanks. The very best tested commercially available manifold, the Continental Vertical Dam Manifold (See Continental NH3 Products, Installation Instructions), is an improvement with variances as high as 2 times per shank (See Summary Chart of Iowa State, Successful Farming Study, EXACTRIX, SFMAN2).

All the tests were carried out with an unsophisticated bucket test that averaged the application for a time period at different rates. A more costly sophisticated dynamic test using "coriolis effect" mass flow meters would prove even greater discrepancies with start and stop and variable rate application from a low of 20 lbs. of applied N per acre to 250 lbs. of applied N per acre. Field maps generated by the Hunt Brothers show this variable rate application on a full applicator width. The dynamics of NH3 manifold systems often require up to 14 seconds for a full rate response. Two hundred feet of travel can occur before the manifolds and the system reach a new equilibrium. The maps often show this lead and lag response. Accuracy can be improved if the manifold is designed properly.

Research in Canada shows additional problems with NH3 application. Thom Weir of Westco Fertilizers points out in his paper, The Use of Anhydrous Ammonia in a Direct Seeding Application, 1998 SSCA presentation, "Because of the danger of seedling injury, it is very important that the application of NH3 be as even as possible across the width of the seeding equipment. Research indicates that a typical applicator error of 16% over or under is common. The typical applicator error across the swath is usually much greater and can exceed 50% fluctuation from row to row-."Weir further states" The manifold is the critical part of the system when applying NH3 with seed."

Gary L. Hnatowich of Saskatoon, Saskatchewan presents further identification of the manifold problems in his paper, Anhydrous Ammonia and Seeding in a Single Pass System, presented 1997, SSCA Conference. "Unlike previously described findings, these results suggest that NH3 is inferior to granular urea in a single pass seeding/fertilizing operation.—However, it was observed that some NH3 treatments produced variable crop height patterns within fertilizer treatments. This suggests uneven nitrogen distribution with NH3 applications.—When NH3 was released from the metering device into the manifold, lack of distribution line pressure may have caused irregular distribution patterns.— Irregularity between the granular urea and NH3 application rate may account, in part, for the yield differences obtained."

Gary Hnatowich further comments "With both side band knives, gaseous losses were visually evident at the high fertilizer rates. At lower application rates, visible losses were not apparent; therefore it appears that the soil was able to effectively bind the NH3." Thus with some shanks applying two, three, and four times more than adjoining shanks it is apparent that gaseous losses can be a significant problem with poor manifold accuracy.

Robert Maze formerly of the Alberta Farm Machinery Research Center and now a project manager with Case/Concord (See Case/Concord brochure, Product Line Air Till Drill Systems, form AE170086) reported in the Summer 1995 in The Engineering in Agriculture Newsletter reported that "losses ranged from 0.5% to 7.5% of the total applied, depending on the opener used." Some opener designs are more sensitive to higher application rates and thus manifolds/airseeders that are applying two, three and four times more NH3 from one shank to another will have high gaseous loss on those high rate shanks. Gary Hnatowich confirms this.

It is further noted by Robert Maze in the AFMRC article Effectiveness of Double Shoot Openers for Applying anhydrous Ammonia while Seeding Wheat, Barley, and Canola, "In general, yields of wheat, barley, and canola were lower when placing anhydrous ammonia with the seed compared with granular urea.—Canola emergence tended to be lower when using anhydrous ammonia as compared to urea." Canola is very sensitive to escaping gaseous NH3. High rate bands with greater gaseous loss can easily kill the respiring not yet germinated seed.

Manifold distribution inaccuracies are a significant problem with other sensitive crops such as flax. Edward J. Deibert, Professor of Soil Science, North Dakota State University reported in January of 1994 in publication EB-62, Fertilizer Application with Small Grain Seed at Planting, that "Some crop seeds are more sensitive to NH3 and salt injury as a result of their size, seed coat type and water content."

Obviously high quality protein wheat varieties e.g. dark northern spring and durum also suffer from under application of nitrogen in dedicated seed row/bands commonly referred to as paired row. Some rows will produce high protein and other rows will produce lower protein. The protein premium paid by millers of quality wheat can be as high as one dollar more per bushel. Durum wheat requires a hard amber vitreous kernel, which is affected by the applied band rate of nitrogen. Careful consideration must be given to using NH3 as a nitrogen source due the inaccuracies of the manifold, which could affect the critical nitrogen protein ratio.

When ammonium phosphate (dry or liquid) is included in the band with liquid or gaseous aminical nitrogen, triammonium phosphate is formed making the plant nutrients more available. This is often referred to as double shooting and when sulfate is included it is referred to triple shooting. This technique was perfected in the western United States in the 60's and 70's in winter wheat production.

When spring grain production became more important with No-till single pass farming techniques the triple shooting technique resulted in some soil chemistry problems. These problems were eventually explained and summarized in a Journal of Fertilizer Issues article by J. T. Harapiak and J. D. Beaton, Review, Phosphorous Fertilizer Considerations for Maximum Yields in the Great Plains, Volume 3, Number 3, July–September, 1986 page 116. The once successful chemical combination was not effective in spring grain production because the bands were over concentrated with aminical nitrogen. New guidelines were set as a result.

Thus if the bands were over concentrated with NH3, aqua ammonia or urea, the ammonium phosphate would not work in the first critical 30 day period of spring grain growth. The plant absorbs seventy percent of the applied phosphate in this first 30-day period. Manifolds that over apply NH3 or aqua ammonia in the bands will reduce yield by reducing the uptake of banded phosphate. The rules for band concentration are explained in Bumper Times, January/February 1991, Level A&B, Volume 16, page 6. No more than 80 lbs. of aminical N should be placed with ammoniated phosphate on a fifteen-inch band center.

Machines with fifteen-inch bands applying ammoniated phosphate sulfates such as 16-20-0-14S should have no more than 48 lbs. of N as NH3 or aqua ammonia in the band with a 40 lbs. per acre rate of applied P (200 lbs. Per acre of 16-20-0-14S). Winter wheat is not as critical to the band concentration rule since the fall-applied bands tend to mellow over the winter period and the ammonia nitrogen converts to nitrate nitrogen. Winter wheat breaks dormancy at time when the free ammonia has converted to mobile nitrate nitrogen.

During the testing and development of the dual stage, dual tier, accumulator manifold several unplanned discoveries were made. The elevated sealing land between the manifold floor and the piston was originally designed to provide a sealing pressure point. Discoveries in the field occurred with poor filters that were to prove that primary port plugging was not a problem. Elevating the piston seal flange allowed the primary secondary ports to equalize the flow in the secondary chamber behind the piston-sealing flange. Thus crop stripping at low ground speeds was avoided even if a good deal of primary ports were plugged. This proved to be an unplanned valuable feature in the acceptance of the product.

Another unexpected result was the successful placement of NH3 with single disc openers. The first tests proved NH3 could be injected at the ground line into an opener created slot with virtually no loss of the volatile NH3 product. The NH3 was injected in the liquid state. Less horsepower and less soil disturbance occurred with ground line injection and shallow placement of the volatile material. The result was successful sales of additional units to place NH3 with single disc openers. Conservation oriented farmers and manufactures of conservation seeding and fertilizing equipment became highly interested in accuracy, safety, variable rate response and a possibility of new opener designs (see Exactrix Sales and Application Guide and the Website <www.exactix.com>.

Prior Art of Liquid and Gaseous Manifolds

The metering of liquid and gaseous fertilizers and pesticides has been accomplished with varying accuracy over the last 50 years using several types of apparatus. These liquid application tools often do not fit the need for precision application of the materials. Liquid fertilizers are of four classes, anhydrous ammonia, clear solutions, suspensions, and non-adjunctive blends of acids. Each class fits a specific customer need due to soil type, climate crop grown, or economic return to the farmer. Some fertilizer classes simply do not fit a cropping area due to infrastructure. Even freight can be a factor in choosing a fertilizer type. The general rule is the more concentrated the material the better the economics. However, timing of application, center pivot irrigation, high value crops and safety can dictate the choice of input.

The most concentrated fertilizer material is NH3 at 82.5% nitrogen. The NH3 is port to port metered with a central cylindrical metering manifold that is supplied by a pressure reducing valve or pressure reducing pump (Dempster Industries Inc., Owners Manual, Model B-4 NH3 Metering Pump). The flow is then directed to a soil engaging shank that releases the material at a subsurface depth to avoid NH3 escape into the atmosphere. The dual stage accumulator manifold can be used with a pressure-increasing pump as outlined in pending patent application Ser. No. 09/173,442 (see EXACTRIX Installation, Service, and Parts Guide and Successful Farming, September, 1998, New NH3 Equipment Promises Greater Accuracy). The dual stage accumulator manifold can also be used with a pressure reducing valve or pressure reducing pump to meter NH3.

The least concentrated commercial liquid nitrogen is clear solution calcium ammonium nitrate at 17% nitrogen. The commonly used clear solution nitrogen is urea ammonium nitrate, solution 28 at 28% nitrogen. The common tool to apply liquid fertilizers is a flooded orifice machine wide manifold supplied by a pressure-increasing pump (see Fertilizer Management for Today's Tillage System, PPI, page 23 and 26). A pressure-increasing pump supplies the manifold that has wide 30 inch spacing stripping orifices or broadcast nozzles. Another method is a squeeze pump or a peristaltic pump. The pump handles large size particles without a very small pressure gradient increase. A multiple chamber stacked flexible vane pump can be used to meter to each individual outlet. A Marriott's bottle design using a vacuum chamber with plate orifices has been commonly used.

Suspension fertilizer is the "kitchen sink" of fertilizer blending whereby clear solution, acids, and dry fertilizers are mixed with clay carriers to produce a cocktail blend to meet specific crop needs. Suspensions are extremely effective when potash or KCL is required primarily for corn production. Micronutrients are easily blended into suspension. The suspension materials often require agitation to keep the base materials suspended prior to the metering and introduction to soil. A suspension analysis is typically heavy to potash e.g. 7-21-21. Squeeze pumps and gravity drop multiple port manifolds with very large low-pressure, low restriction, supply lines are the two most common distribution systems.

Acid base fertilizers are utilized in the western United States to improve nutrient availability in high pH calcareous soil. Acid base materials are applied in high per acre volumes. The volumes are as high as 110 gallons per acre for potato production. Squeeze pumps are the most common metering system for acid base fertilizers.

The dual stage manifold shown in this invention is utilized primarily with clear solutions and NH3. It is also applicable to suspensions and acid base fertilizer.

NH3 manifolds are commercially available from John Blue (see enclosed John Blue specification sheets). John Blue builds two types of manifolds. The plain open manifold that can have variances of three to four times more material between shanks. The equalizer manifold has similar port variances but it does have a rotatable center section that opens or closes down the outlet ports to maintain a higher or lower manifold pressure with varying crop needs and field rate applications. These manifolds are not used to meter clear solutions.

Squibb-Taylor also offers a simple NH3 manifold that distributes the NH3 irregularly with up to four times variance (see S-T catalog CATAA96). It is a simple casting with a common central open area leading to the port outlet and hose barbs. Thus NH3 is free to take the path of least resistance as a gas (0.597 S.G.) or a liquid (0.662 S.G.). The lines are sized to ⅜ and ½ inch diameter and must be of equal length and sequenced due to the transitional state mixture of gas and liquid. The manifold is slope sensitive and multiple manifolds must be used on wide airseeders and applicators. These NH3 manifolds are not used with acid base, clear solutions or suspensions.

Continental NH3 Products offers a Vertical Dam Manifold that separates liquid from gas at the metering point of the port outlets. Reference material included from Continental NH3 Products includes, Installation Instructions, sales brochure, What You Don't Know Could Be Killing Your Profits, When A Tee Is Not a Tee. The manifold should not be operated higher than 65% of vapor pressure and is limited to no more than 150 psi of line pressure due to use of EVA 150-psi supply lines from the separator. Generally ⅜ EVA injection lines are used after the port outlets which are rated at 75 psi. Thus the system is incapable of delivering liquid ammonia at all application temperatures. The Vertical Dam Manifold is not used with other liquid fertilizers.

Iowa State University has measured the Coefficient of Variance for the Vertical Dam Manifold. Compared applicator shanks can apply as much as 2.4 times more than the adjoining shank. Wide airseeders on 7.5 inch and 10 inch narrow band spacing require up to three separators and seven manifolds with special outlet rings (see Continental Vertical Dam Manifold Selection Guide). The Vertical Dam Manifold is not recommended for regulating NH3 below 75 lbs. of applied N per acre on 10 inch band spacing. This lower bottom range is not acceptable for variable rate, site-specific application of NH3. The dual stage accumulator manifold will meter accurately 20 lbs. of applied N per acre on 7.5-inch band spacing. The dual stage, dual tier, accumulator manifold solves the port variance problem. The new manifold is produced in port configurations up to one-hundred-twenty outlets from one central manifold. The dual stage accumulator manifold using range and terminal orifices operate over a much wider pressure range. The orifices are not changed when band spacing increases from 10 inch to 20 inch as crop choices are changed in the northern Great Plains.

U.S. Pat. No. 4,807,663, Feb. 28, 1989, Manifold for the Application of Agricultural Ammonia, James S. Jones describes in claim 1, a liquid and vapor mix entering the manifold which is accelerated, defined and then remixed as a gas and liquid as it leaves the Vertical Dam Manifold. The result is an unacceptable Coefficient of Variance (CV). Agricultural engineers at Iowa State found the Coefficient of Variance in three tests to be between 15 and 19%. Agricultural scientists regard a CV of 15% or greater to be unacceptable, 10 to 15% as acceptable, 5 to 10% very good and less than 5% excellent (see Choosing the Right Seeding and Fertilizing Equipment, page 7, by Miles E Jorgenson, Humboldt Station, Alberta Farm Machinery Research Center). The dual stage accumulator manifold solves this problem of high CV by maintaining the NH3 in a common specific gravity liquid state through the metering orifices. Using the dual stage accumulator manifold the lower specific gravity of the NH3 gas is no longer a problem at variable rate low flows and above normal high flow rates. The dual tier design allows for more ports to be combined from one central manifold providing central regulation timed from one point.

The Vertical Dam Manifold requires that the outlet ring be changed with changes in band spacing or changes in manifold flow. The Vertical Dam Manifold cannot respond to quick rate changes required for variable rate, site specific farming. Two complete Vertical Dam Manifold system arrangements are required to provide the same feature of one dual stage accumulator manifold.

The Vertical Dam Manifold uses aluminum components that are corroded by the common additive N-serve. Aluminum components are readily corroded by chelated micronutrients and acidic fertilizers. Operators are warned to avoid N-serve. The dual stage, dual tier accumulator manifold uses materials such as stainless steel, neoprene rubber, silicone oil, and nylon all which are compatible with N-serve, acid base fertilizers, micronutrients, and pesticides.

U.S. Pat. No. 4,448,540, May 15, 1984, Apparatus for Mixing a Liquid Additive Compound with Vapor and Liquid Phases of Anhydrous Ammonia, David M. McLeod, shows a mixing device for additives such as N-serve, a nitrogen stabilizer. An earlier U.S. Pat. No. , 4,432,651, Feb. 21, 1984, Apparatus for Mixing Vapor and Liquid Phases of Anhydrous Ammonia, David M. McLeod of Dow Chemical Co shows the first step of the improvement for introducing N-serve into the vapor and liquid stream flow of NH3. These two patents explain very well the problems of metering NH3 accurately. Neither of these two patents consider variable rate nor due they propose a dual stage port design that assures accurate regulation at slow and normal speeds. No representation is made of a dual tier design. No consideration is given to port plugging. Primary port plugging is considered insignificant with the elevated sealing land of the dual stage accumulator manifold. Primary ports if plugged with share flow in the secondary chamber assuring accurate flow at low speeds to all ports (see Exactrix Training Bulletin Jan. 19, 1999).

Although considerable development work was carried out by Dow Chemical to perfect the mixer/manifold arrangement the commercial use was never successful. Utilization of this apparatus produced varying results of effectiveness of the additive. In many cases there was negative economic advantage to the additive mixing systems. Due to wide variance of flow between each port and the presence of three different specific gravity materials at the critical manifold metering point, the Dow manifold failed to produce the desired results. The variance of up four times between each shank resulted over and under application of NH3 over the machine width. The dual stage accumulator manifold does not accept additive injection at the manifold. The additives such as N-serve are injected downstream at the filter where the material is mixed with non-aberrant NH3 prior to the pump or pressure-reducing valve. Thus thorough mixing occurs with NH3 in a liquid state.

A complete research of the prior art indicates that there is no manifold commercially offered or ever offered that could or will apply both NH3 and liquid fertilizers and pesticides using the same components. The manifold is uniquely designed to handle all liquid fertilizer materials and when combined with the proper pump the system is most versatile.

Objects and Advantages

Accordingly, several objects and advantages of my invention are benefits of providing two pressure stages utilizing an elevated piston sealing land with up to two distribution layers. Safety is improved with a simpler system with fewer components that exceed safety requirements by a minimum factor of 2.

Germination damage of seed from is reduced since fluid liquid fertilizer is more precisely placed. Nitrogen stabilizers, micronutrients, insecticides, and fungicides can be placed more accurately. NH3 can be placed closer to the seed. Improved opener designs can be used. The injection lines are up to 3 times smaller and yet durable. Band concentration is even and exact across the machine width at slow and normal speeds. Liquid orthophosphate and polyphosphate fertilizer can be placed in a smaller area without touching disc blades. NH3 injection lines can be routed into openers with marginal clearance.

System pressures can be elevated up to 300 psi. The orifices once installed are seldom changed due to a much broader pressure range. This is ideal for variable rate, site specific farming since the system handles a much greater dynamic range based on field speed or band placed rate of NH3.

The placement of NH3, liquid fertilizers and liquid pesticides in each band is accomplished with an even uninterrupted flow. The accumulator stores a small amount of liquid material directly above the ports providing an even pressurized flow. This improves crop uptake of nutrients and pesticides since each band is an even exact lineal band concentration. Each plant feeds equally and evenly with a strong competitive effort against weeds. This results in higher crop yields and less loss of nitrogen due to leaching.

Volatilization of nitrogen is also reduced since bands are not overly concentrated in any one band. Nitrogen use efficiency goes up and nitrogen application rates can be reduced about 10%.

The dual stage, dual tier accumulator manifold is unique to industry since it can be used with NH3 and yet the same arrangement will apply liquid formulations of nitrogen and phosphate.

Practical variable rate changes can occur from 20 lbs. N/acre to 250 lbs. N/acre since the manifold has two pressure and flow stages. The low volume primary ports meter liquid material accurately at very low flows and low pressures. The secondary ports contribute to the system as the piston moves up allowing maximum flow and pressure and short response time. Fertilizer and pesticides can be applied very accurately from one central dual stage manifold.

The economic impact and utilization of placed phosphate in the band with NH3 and liquid nitrogen is substantially improved. Spring crops can utilize banded phosphate with NH3 and liquid nitrogen more efficiently since phosphate uptake by the plant occurs without the "hot band" effect of irregular and over concentrated bands of aminical forms of nitrogen.

The growing crop can more fully utilize all of the placed volatile leachable aminical nitrogen. Over application of low cost aminical and nitrate based nitrogen is critical to protect the environment. Even exact rates of liquid nitrogen improve the environment by decreasing leaching of nitrate. Nitrogen stabilizers such as N-serve can be more effectively added and mixed with aqueous ammonia and anhydrous ammonia. This additive further reduces the chance of mobile nitrate leaching through the soil and into the drinking water.

Another critical advantage is the quick response to variable rate, site specific, GPS controllers. Up to 15 times less displacement in the applicator lines means less system storage and an immediate response to a rate change. The dual stage, dual tier manifold and lines store a minimum of fertilizer and pesticide material. A full rate change can occur in 3 feet or less of ground travel at normal application speeds.

The dual stage manifold can accept flow from all types of pumps, pressure reducing valves and electronic control systems. The dual stage, dual tier manifold design feature eliminates the need for several flooded manifolds to cover various application ranges or several NH3 manifolds and flow dividers for wide airseeders. Up to 120 port outlets can be supplied from one central manifold location. Set-up and maintenance cost is reduced.

Management of metering orifices is not critical. The orifices are more protected from soil engaging tool wear. Terminal orifices are much smaller with precision orifice manufacturing and a low turbulence design. Injector nozzles at double disc and single disc openers can accurately target bands and seed rows without the buildup of non-targeted liquid fertilizers and pesticides on the rolling blades.

The versatile dual stage accumulator manifold can be connected to lines and openers without regard to sequence arrangement. Applicators with uneven number of openers or a short odd number of openers can utilize one common multiport manifold by blocking off any port outlet. Airseeders can be easily changed from a narrow band spacing to a much wider band spacing by disconnecting the lines and capping off the unused ports. Certain crops require wider fertilizer band and seed row spacing such as sunflowers while cereal crops such as wheat require narrow fertilizer band and seed row spacing. The same manifold works for both band spacings with a minimum of lost time in changing band spacing.

The elevated piston-sealing flange allows the secondary ports to meter accurately even if one or more of the primary ports are plugged. The primary ports share pressure and flow in the secondary chamber. Contaminated liquids are filtered and removed prior to the manifold. The small primary ports if plugged do not result in crop stripping or over application into other ports.

The cost savings are significant and aminical and nitrate nitrogen can be placed shallow or deep. Airseeder operators can add the liquid nitrogen dual stage manifold to compliment their dry fertilizer system lowering their cost over dry nitrogen sources by $5.00 to $8.00 per acre. They can often double their time between fills since the dry box contains only high analysis ammoniated phosphate. NH3 tanks are simply towed behind the seeder with up to 8,000 lbs. of nitrogen.

With the onset of cold weather the applicator will continue to apply NH3 at accurate rates even with low tank pressure. This often results in two to three weeks of additional fall banding for corn production. The operators can operate much earlier in the day and extend their application of NH3 into freezing nights if necessary. This new system assures the long-term use of NH3 and liquid nitrogen because it is safer and more economical to use.

Previous inventors and developers found it obvious to use existing low-pressure pumps, dual flooded orificed low-pressure manifolds, and multiple NH3 pressure reducing manifolds. The dual stage, piston accumulator manifold is unique and novel to the industry. Many of dual stage manifold's performance values were unplanned discoveries. Such discoveries as engaging the accumulator piston directly above the primary and secondary ports, elevating the piston sealing flange to allow flow equalization after the primary ports, and developing a new unique design to incorporate two manifolds into one common manifold have never been observed in previous NH3 and liquid manifold design art.

Further objects and advantage of my invention will become apparent from a consideration of the drawings and ensuing description.

REFERENCE NUMERALS IN DRAWINGS

| | |
|---|---|
| 20 single tier manifold | 22 dual tier manifold |
| 24 accumulator | 26 high-pressure adapters |
| 28 injection lines | 30 terminal expansion orifice |
| 32 secondary chamber | 34 range orifices |
| 36 secondary port floor | 42 accumulator cylinder |
| 40 accumulator charging valve | 46 accumulator piston |
| 44 inlet supply flow | 50 primary upper port |
| 48 primary lower port | 54 piston sealing land |
| 52 compression clamp | 58 primary port |
| 56 secondary port | 62 o-ring seals |
| 60 silicone oil | 66 nitrogen gas |
| 64 liquid fertilizer | 70 pump |
| 68 safety shield | |
| 72 filter | |

Summary: In accordance with the present invention of an apparatus for metering accurately agricultural liquids is thereby presented in the form of a piston accumulator, dual stage, minimum displacement liquid fertilizer and pesticide distribution manifold.

Description—FIGS. 1 to 8

Figure 1:
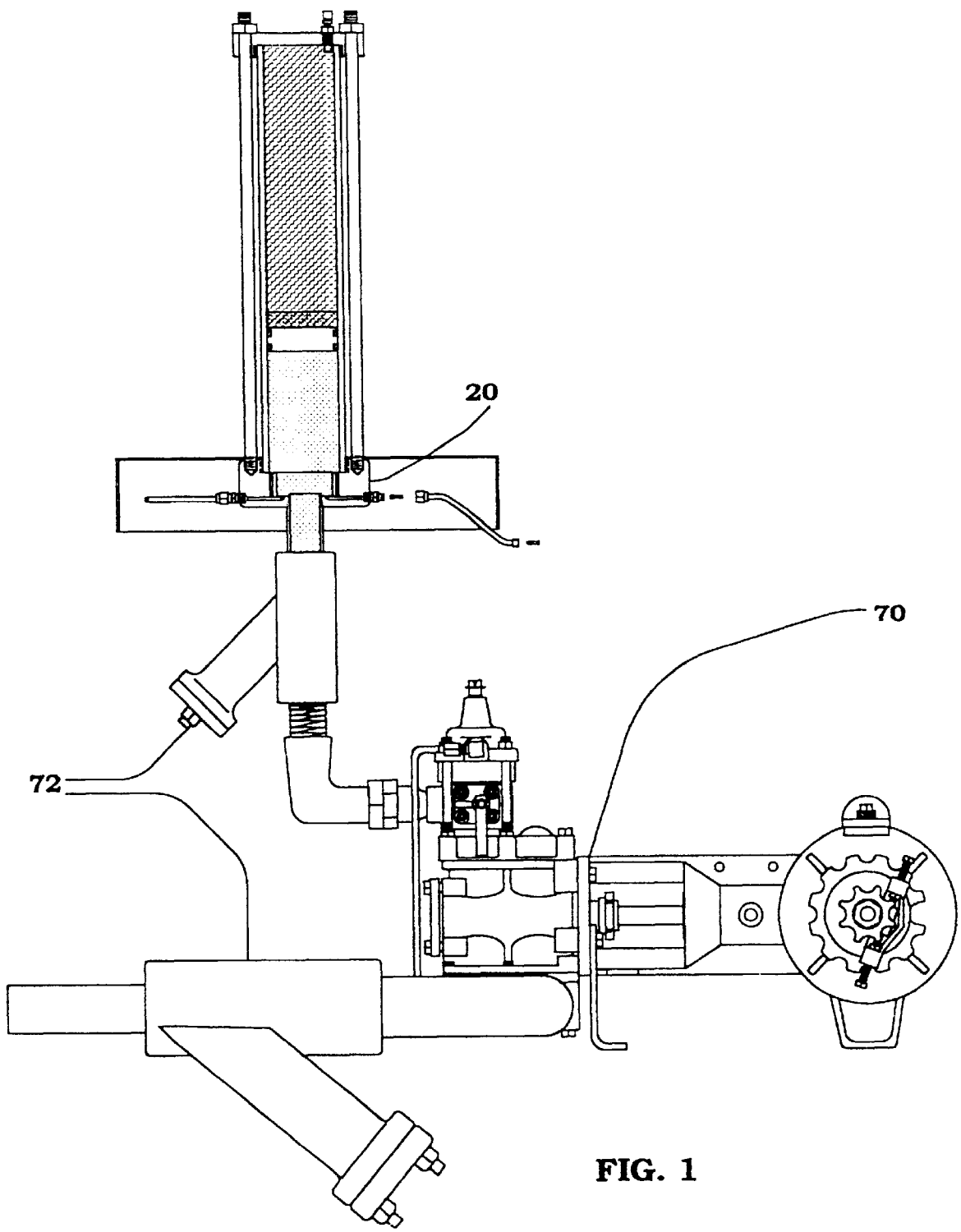
FIG. 1 is a general view of a typical system with supporting but not required components.
Figure 2:
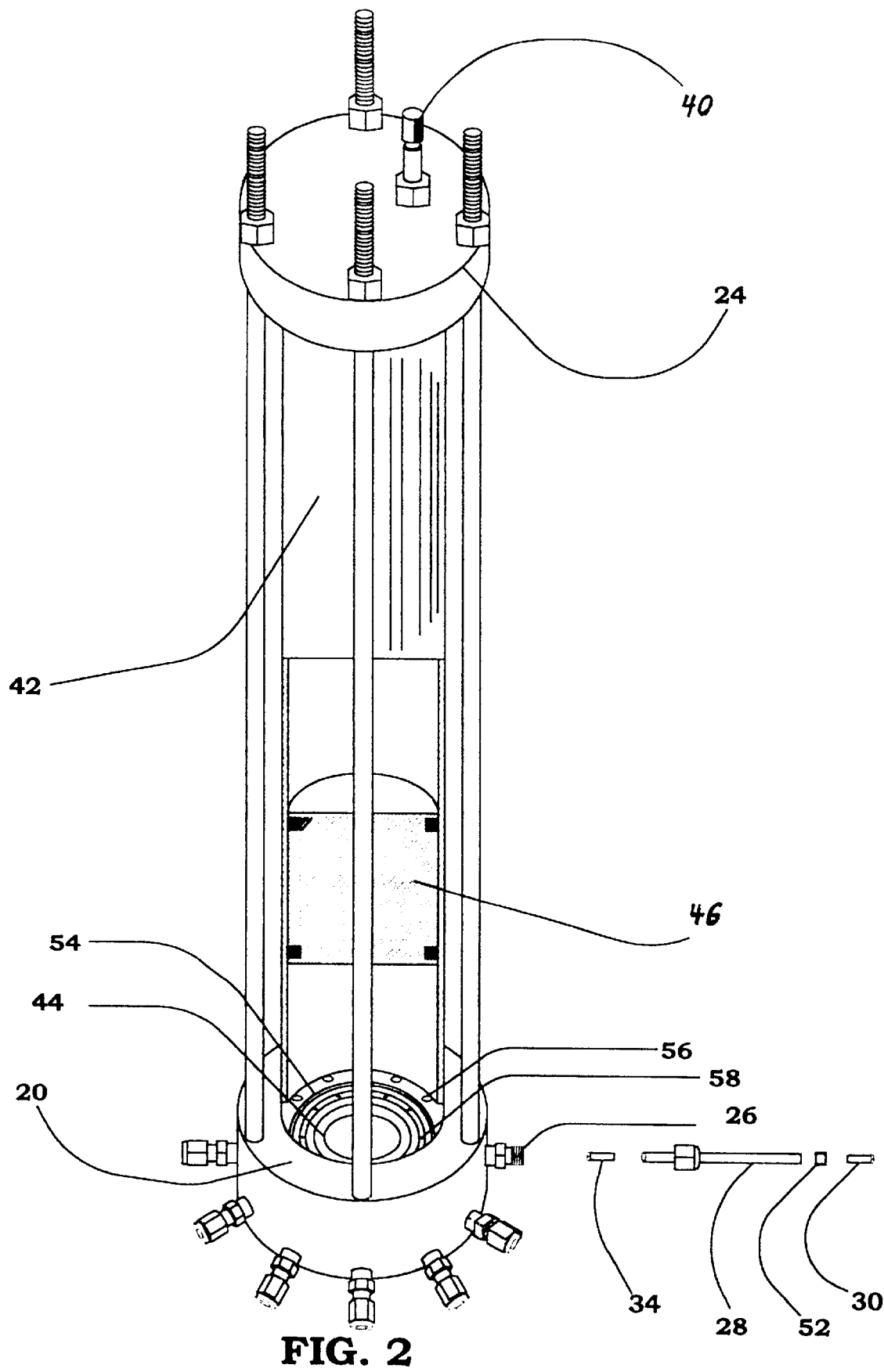
FIG. 2 is a perspective view of my invention that includes a dual stage manifold, an accumulator piston, orifice and line adapters.

A typical embodiment of the system is illustrated in FIG. 1, which shows the dual stage, single tier manifold (i.e., fluid distributor) 20, a pump 70, and filters 72. In FIG. 2 liquid inlet supply flow 44 comes from the pump 70, shown in FIG. 1, or a pressure-reducing valve and enters the volume defined generally below position 46 (i.e., the fluid distribution chamber). In FIG. 2 perspective view the piston 46 has moved off the piston sealing land 54. Liquid flow leaves the fluid distribution chamber and the manifold 20 through primary ports 58 and secondary ports 56. At low liquid pressures, piston 46 directs liquid flow through a plurality of low volume primary ports 58. At higher liquid pressures piston, 46 directs liquid flow though the plurality of low volume primary ports 58 and a plurality of high volume secondary ports 56 in conjunction. The liquid then moves out of the manifold 20 to a high-pressure adapter 26, through the range orifice 34, the injection lines 28, and the terminal expansion orifice 30, which is held in place by a compression clamp 52.

Figure 3:
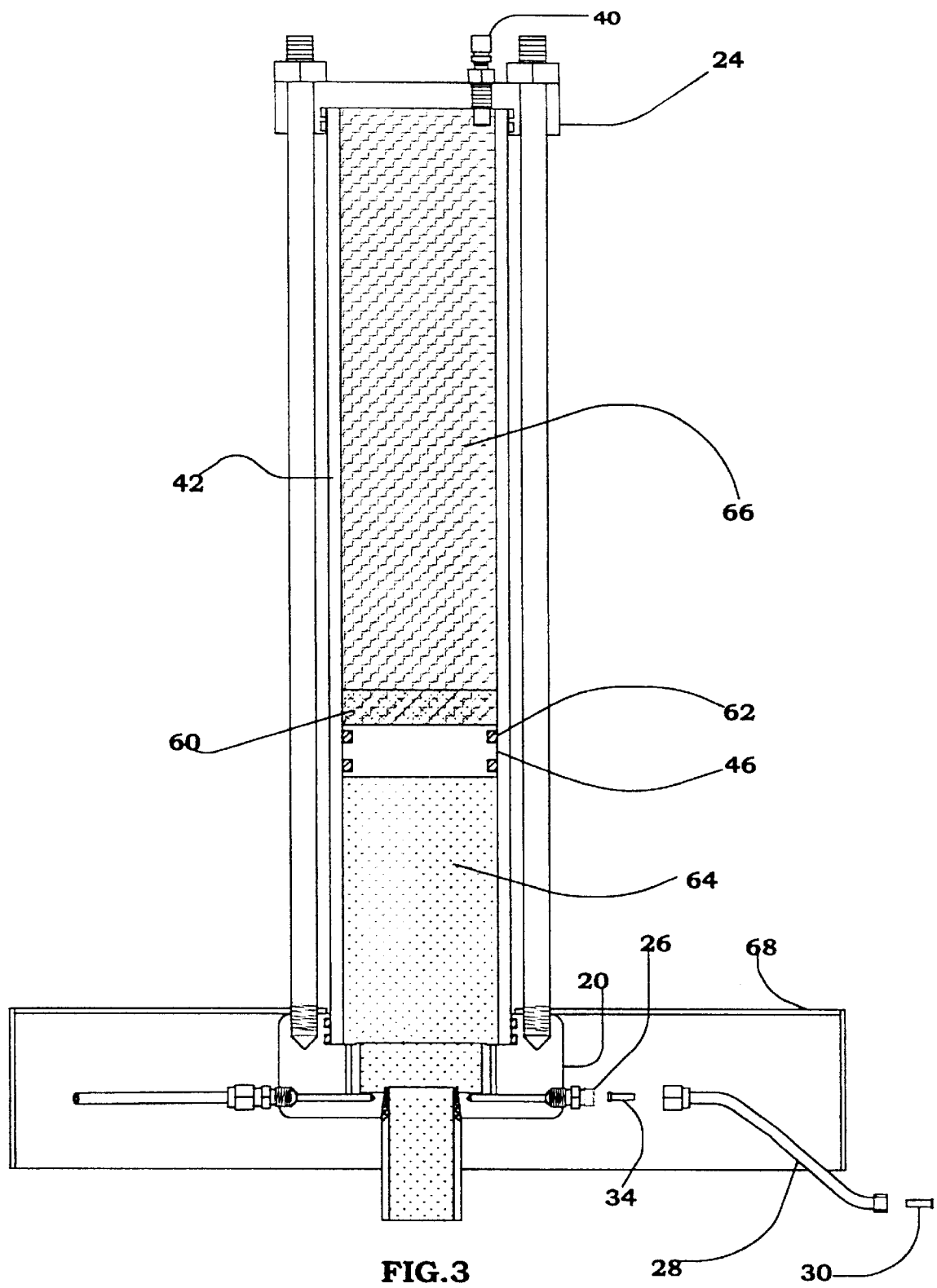
FIG. 3 shows a cross sectional view of a dual stage, single tier manifold, the range orifice and the terminal expansion orifice.

In FIG. 3 a dual stage, single tier manifold 20 is shown metering liquid in second stage. The volume in accumulator 24 above piston 46 (i.e., the compression chamber) is charged with nitrogen gas 66 by means of an accumulator charging valve 40. The pressure of the nitrogen gas 66 charged to the compression chamber of the accumulator 24 is adjustable to a predetermined pressure based on the desired low and high volume rates per acre utilizing site specific, variable rate technology. The adjustable pressure of the nitrogen gas 66 provides an adjustable force for biasing movable piston 46 towards engagement with sealing land 54. Silicone oil 60 is located directly above piston 46 to lubricate and seal the piston O-rings 62. Dual stage single tier manifolds 20 are normally designed for applications requiring between 12 and 60 port high pressure adapters 26 on a single layer.

Figure 4:
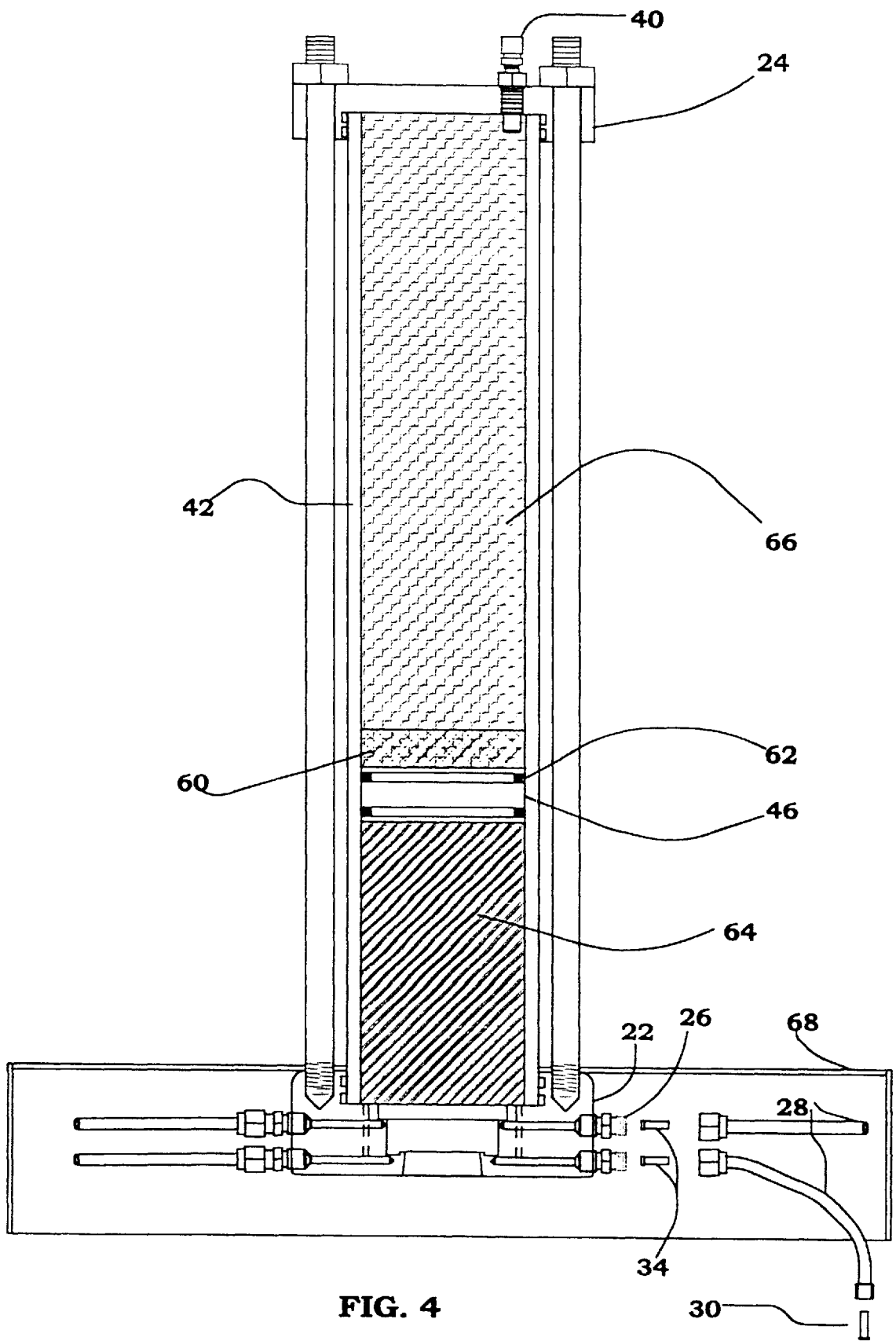
FIG. 4 shows a cross sectional view of a dual stage, dual tier manifold.

FIG. 4 is a dual stage, dual tier manifold 22 shown metering liquid material in the second higher pressure, higher flow stage. In the dual tier configuration, high pressure liquid is metered through upper primary ports 50, lower primary ports 48, and secondary ports 56. Primary ports 50, 48 and secondary ports 56 are summarily connected with two layers of manifold port outlets arranged radially around the outside diameter of distribution manifold 22. A shield 68 protects the high-pressure adapters 26 and injection lines 28 from ultraviolet light and mechanical damage. If the injection lines 26 are improperly installed the liquid fertilizer is directed downward as a safety feature. The manifold 22 has two layers of high pressure adapters 26 which are radial offset around the diameter of the manifold 22 to allow better access to the adapters 26, range orifices 34 and the injection lines 28. For wide narrow band airseeders dual tier manifolds 22 are normally organized in high-pressure adapter arrangements of forty-eight, seventy-two, and one-hundred-twenty outlets.

Figure 5:
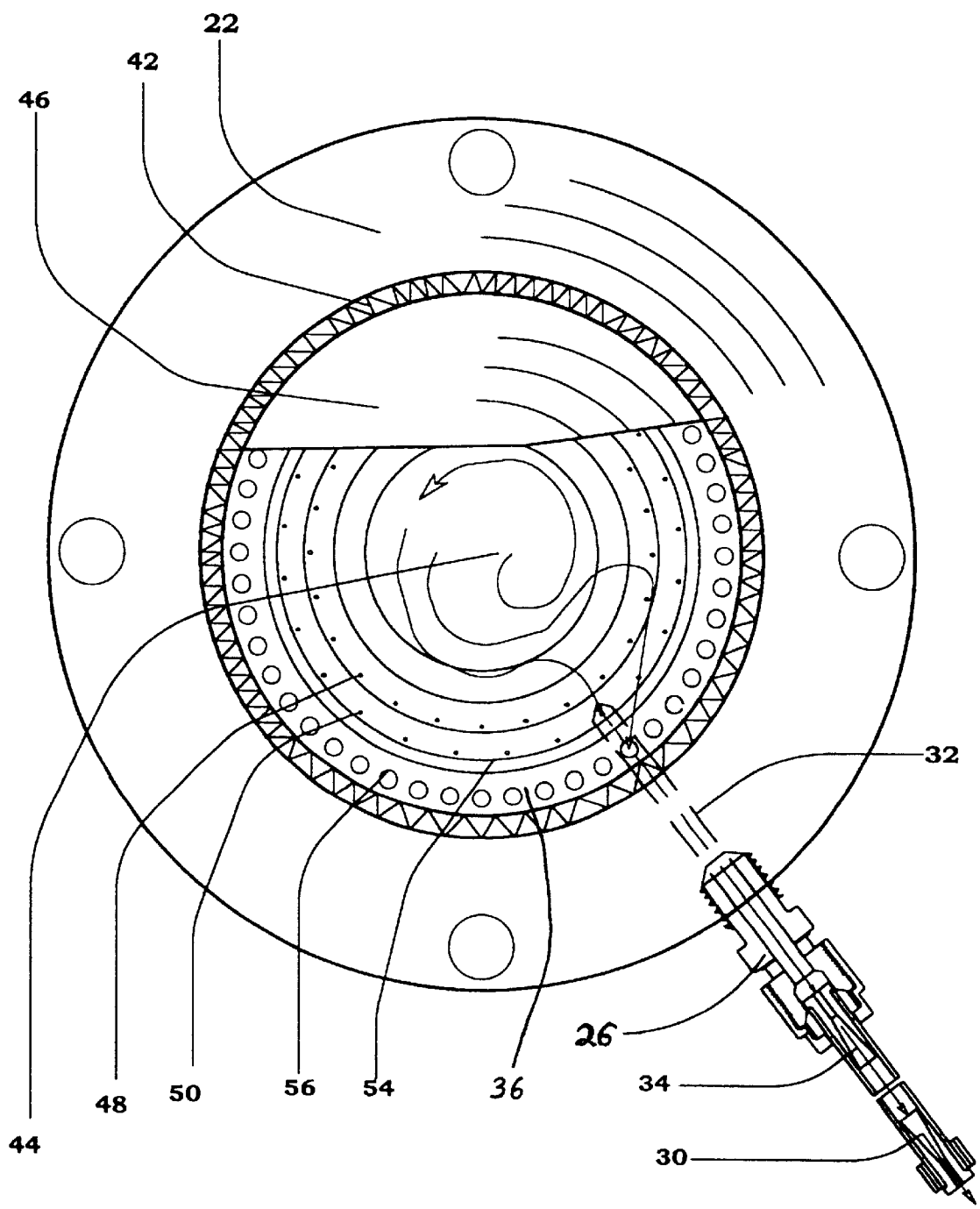
FIG. 5 shows a top view of a 48 port, dual stage, dual tier manifold.

FIG. 5 shows a top view of a forty-eight port, dual stage, dual tier manifold 22 metering liquid fertilizer or liquid pesticides. The liquid material 44 travels into the manifold and is trapped by the upwardly moved piston 46 and the accumulator cylinder wall 42. Since the piston 46 is not resting on the piston sealing land 54 the flow is directed to the upper primary ports 50, the lower primary ports 48 and the secondary ports 56. Movement of piston 46 off sealing land 55 combines liquid flows from first stage primary ports 58, 26 and second stage secondary ports 56 in secondary chamber 32. After passage of liquid flow past each individual primary port 58, 26 the liquid enters secondary chamber 32 where flow and pressure from each primary port 58, 26 is shared. Thus, pressure and flow of the fluid is equalized before passing out of the manifold 22. The ports 50, 48, and 56 supply the secondary chamber 32 and out to the high-pressure adapter 26, then through the range orifice 34 and past the terminal orifice 30.

Figure 6:
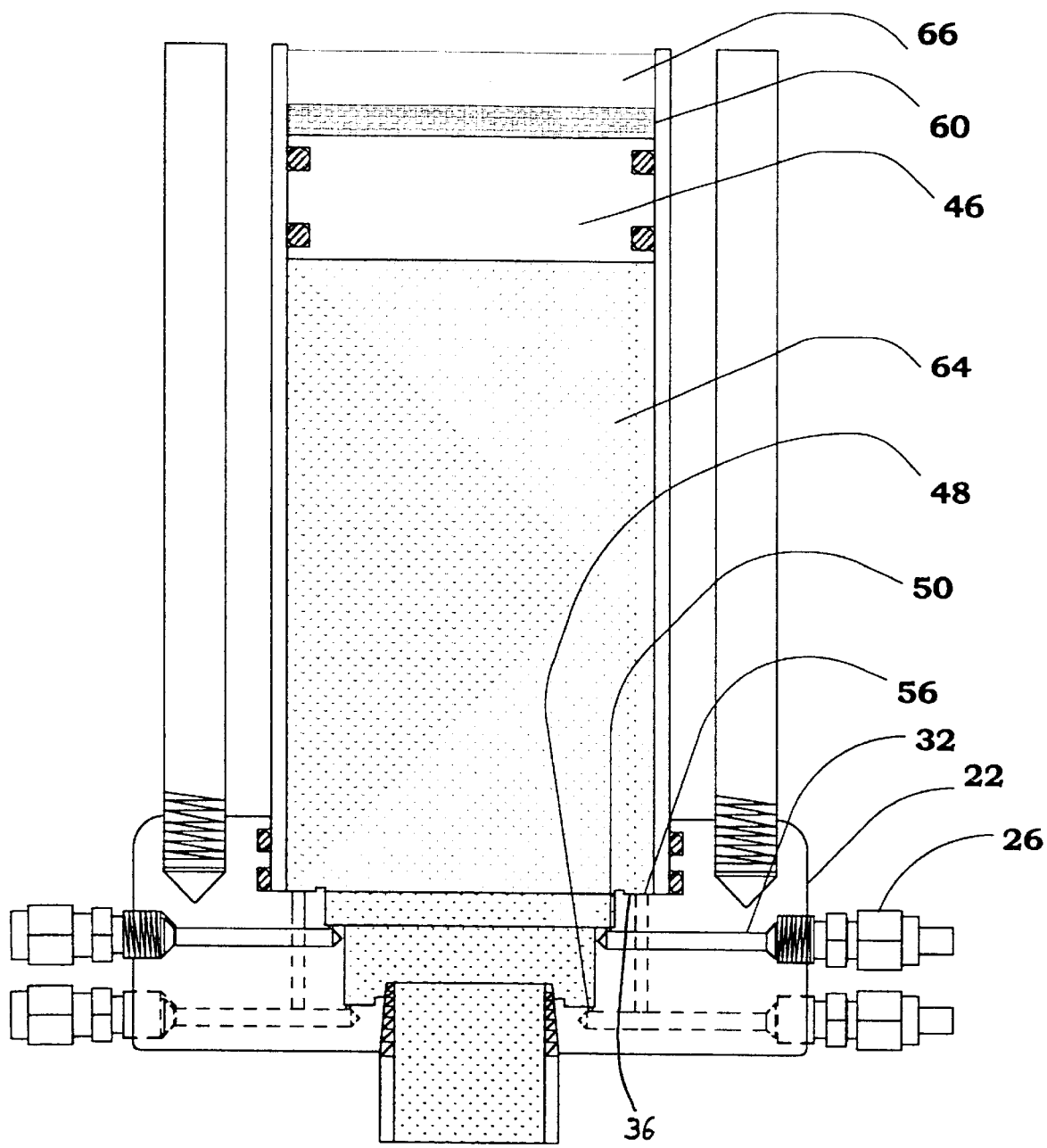
FIG. 6 shows an enlarged cross sectional view of a higher-pressure activated dual stage, dual tier manifold.

FIG. 6 shows an enlarged cross sectional view of a dual stage, dual tier manifold 22. The piston 46 has moved upward off the piston sealing land 54. The liquid fertilizer 64 is stored under higher pressure directly above the secondary ports 56, the upper primary ports 50 and lower primary ports 48 so that the fertilizer can flow directly out of the fluid distribution chamber through all the ports 48, 50, 56. The high-pressure second stage flow then passes into the secondary chamber 32 and out past the high-pressure adapters 26. The nitrogen gas 66 has been compressed to a pressure equivalent to the pressure of the higher-pressure liquid fertilizer 64. The piston and the O-rings separate the nitrogen gas in the compression chamber from the liquid fertilizer in the fluid distribution chamber with a thin layer of silicone oil 60. Thus, the piston 46 fluidly divides the chamber within which the piston is disposed (i.e., the main chamber) into the compression chamber (generally positioned above the piston 46) and the fluid distribution chamber (generally positioned below the piston 46).

Figure 7:
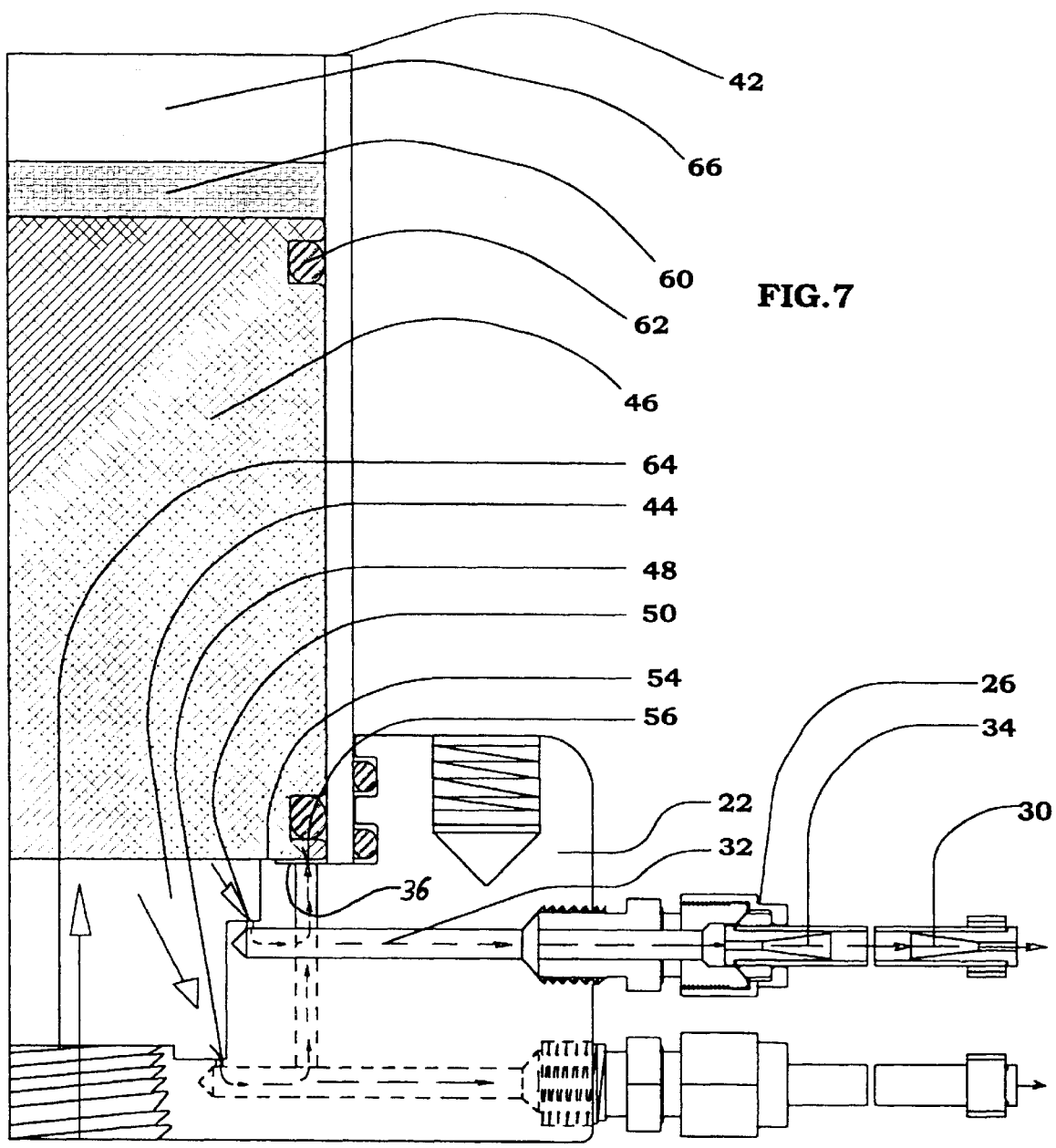
FIG. 7 shows an enlarged cross sectional view of a dual stage, dual tier manifold applying liquid nitrogen below accumulator charge pressure in a first stage position.

FIG. 7 is a fully enlarged cross sectional view of the dual stage, dual tier manifold 22 which shows the inlet supply flow 44 path of the liquid fertilizer 64. This first stage function occurs when the liquid fertilizer 64 in the fluid distribution chamber is at a pressure below the nitrogen gas charge pressure 42. The liquid 64 is forced to flow directly out of the fluid distribution chamber through the upper 50 and lower primary ports 48 (but not secondary ports 56 in the compression chamber) and into the large secondary chamber 32. The liquid then flows up to the secondary piston floor 36 if a primary port 48,50 is plugged and over to a radial adjoining secondary port 56. Thus, as shown by the arrows in FIG. 7, the secondary chamber 32 can provide for indirect fluid communication between the secondary ports 56 and the fluid distribution chamber, even when piston 46 substantially terminates direct fluid flow out of the fluid distribution chamber through secondary ports 56. If no primary ports 48, 50 are plugged the liquid 64 flows out the secondary chamber 32 to the high pressure adapter 26, the range orifice 34, the injection lines 26 and finally to the terminal orifice 30.

Figure 8:
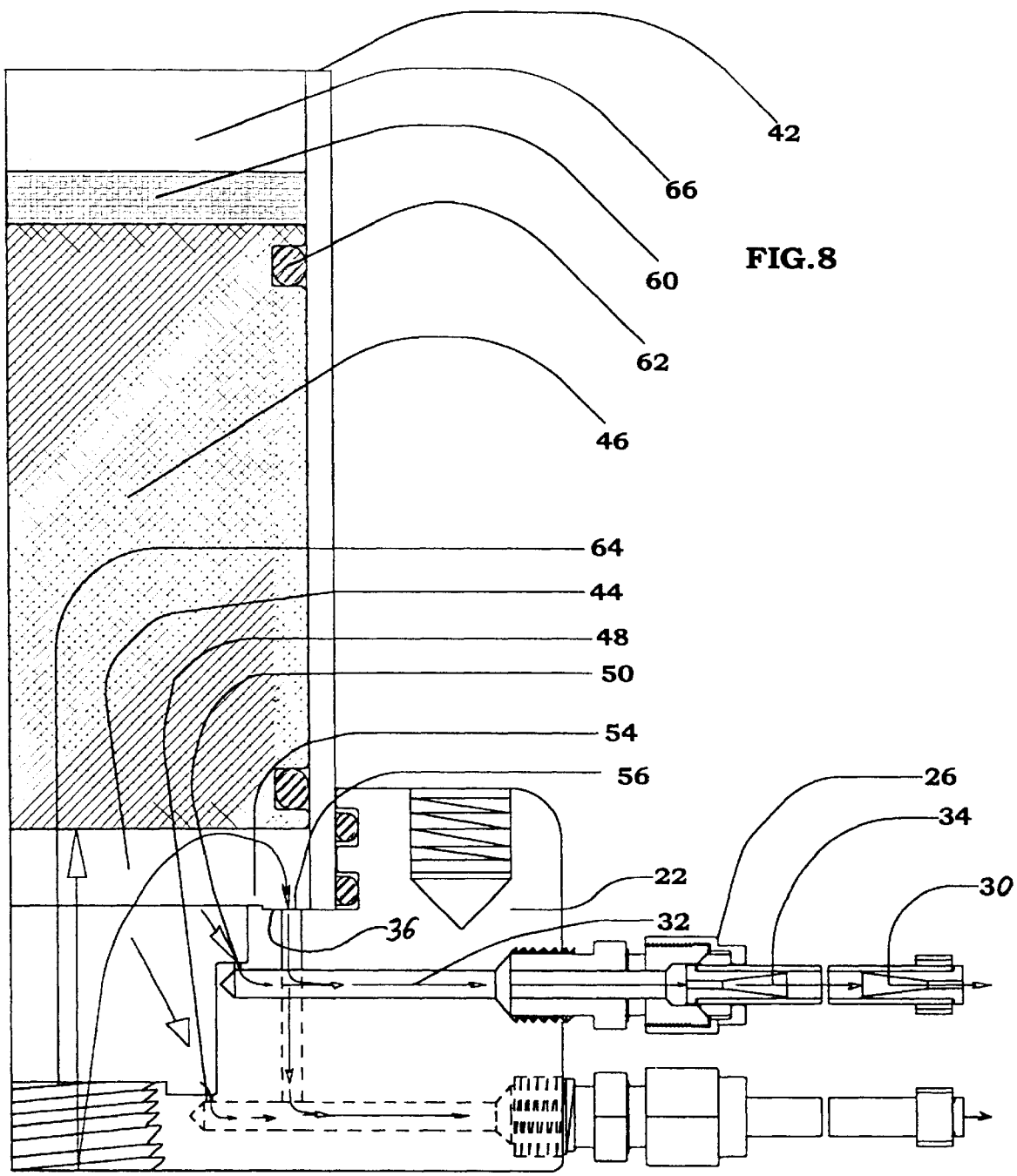
FIG. 8 shows an enlarged cross sectional view of a dual stage, dual tier manifold applying liquid nitrogen above accumulator charge pressure in a second stage position.

FIG. 8 is a fully enlarged cross sectional view of the dual stage, dual tier manifold 22 which shows the inlet supply flow 44 path of liquid fertilizer 64 at the second stage higher pressure flow. The liquid fertilizer 64 forces the piston 46 upward raising the pressure of the nitrogen gas charge 66. The cylinder wall 42, the silicone oil 60 and the piston O-rings 62 create a seal between the nitrogen gas 66 in the compression chamber and the liquid fertilizer 64 in the fluid distribution chamber. All primary ports 48,50 and secondary ports 56 provide flow to the secondary chamber 32. If a primary port 48,50 is plugged the secondary chamber 32 equalizes the pressure and flow to the high pressure adapters 26, the range orifice 34, the injection lines 28 and the terminal orifice 33.

I claim:

1. A dual-stage manifold for distributing an agricultural fluid, said manifold comprising:

a body defining a main chamber;

a piston disposed in the main chamber and shiftable between a first stage position and a second stage position, said piston dividing the main chamber into a fluid distribution chamber and a compression chamber, said fluid distribution chamber and said compression chamber being substantially fluidly isolated from one another;

a primary outlet port in direct fluid communication with the fluid distribution chamber; and a secondary outlet port in direct fluid communication with the fluid distribution chamber when the piston is in the second stage position, said piston operable to substantially terminate direct fluid flow out of the fluid distribution chamber through the secondary outlet port when the piston is in the first stage position.

2. A manifold as claimed in claim 1, said piston operable to vary the volume of the distribution chamber when shifted relative to the body.

3. A manifold as claimed in claim 2; and a biasing mechanism for urging the piston towards the first stage position.

4. A manifold as claimed in claim 3, said biasing mechanism located in the compression chamber.

5. A manifold as claimed in claim 4, said compression chamber containing a compressible fluid.

6. A manifold as claimed in claim 2; and a fluid inlet for supplying the agricultural fluid to the fluid distribution chamber.

7. A manifold as claimed in claim 6, said piston shifted to the first stage position when the pressure of the fluid in the fluid distribution chamber is insufficient to overcome the force exerted on the piston by the biasing mechanism.

8. A manifold as claimed in claim 7, said piston shifted to the second stage position when the pressure of the fluid in the fluid distribution chamber is sufficient to overcome the force exerted on the piston by the biasing mechanism.

9. A manifold as claimed in claim 8; and a sealing surface disposed between the primary and secondary outlet ports, said sealing surface substantially sealingly contacting the piston when the piston is in the first stage position.

10. A manifold as claimed in claim 9; and a secondary chamber fluidically coupled to the primary and secondary outlet ports and spaced from the fluid distribution chamber.

11. A dual-stage manifold for distributing agricultural fluids, said manifold comprising:

a body defining a main chamber;

a piston disposed in the main chamber and shiftable between a first stage position and a second stage position; and a fluid distributor sealingly coupled to the body adjacent the main chamber, said piston dividing the main chamber into a fluid distribution chamber and a compression chamber, said fluid distribution chamber and said compression chamber being substantially fluidly isolated from one another, said fluid distributor presenting a fluid inlet, a primary outlet port, and a secondary outlet port each in direct fluid communication with the fluid distribution chamber when the piston is in the second stage position, said piston operable to substantially terminate direct fluid flow out of the fluid distribution chamber through the secondary outlet port when the piston is in the first stage position.

12. A manifold as claimed in claim 11, said fluid distributor presenting a sealing surface interposed between the primary and secondary outlet ports, said sealing surface configured to sealingly contact the piston when the piston is in the first stage position.

13. A manifold as claimed in claim 12, said primary and secondary outlet ports spaced from one another in a direction corresponding to the direction of shifting of the piston in the main chamber.

14. A manifold as claimed in claim 13, said fluid distributor defining a secondary chamber for fluidically coupling the primary outlet port and the secondary outlet port, said secondary chamber spaced from the distribution chamber.

15. A manifold as claimed in claim 14, said fluid distribution chamber defining a volume which is variable by shifting the piston relative to the body.

16. A manifold as claimed in claim 15; and a range orifice fluidically coupled to the secondary chamber for metering distribution of a fluid from the manifold.

17. A manifold as claimed in claim 11; and a biasing mechanism for exerting a counter force that urges the piston towards the first stage position.

18. A manifold as claimed in claim 17, said piston shifted into the first stage position when the distribution chamber is subjected to a distribution pressure which exerts a distribution force on the piston that is less than the counter force exerted by the biasing mechanism.

19. A manifold as claimed in claim 18, said piston shifted into the second stage position when the distribution force is greater than the counter force.

20. A manifold as claimed in claim 19, said biasing mechanism adjustable to vary the magnitude of the counter force exerted on the piston.

21. A manifold as claimed in claim 11,
said compression chamber located on the side of the piston generally opposite the distribution chamber.
22. A manifold as claimed in claim 21,
said piston shifted into the first stage position when the distribution chamber is subjected to a distribution pressure which is less than a compression pressure in the compression chamber.
23. A manifold as claimed in claim 22,
said piston shifted into the second stage position when the distribution pressure is greater than the compression pressure.
24. A manifold as claimed in claim 23; and
a compressible fluid disposed in the compression chamber.
25. A manifold as claimed in claim 24; and
a charging valve for adding or removing the compressible fluid to and from the compression chamber.
26. A manifold as claimed in claim 25,
said compressible fluid comprising nitrogen.
27. A dual-stage, dual-tier manifold for distributing agricultural fluids, said manifold comprising:
a body defining a main chamber;
a piston disposed in the main chamber and shiftable between a first stage position and a second stage position; and
a fluid distributor sealingly coupled to the body adjacent the main chamber,
said piston dividing the main chamber into a fluid distribution chamber and a compression chamber,
said fluid distribution chamber and said compression chamber being substantially fluidly isolated from one another,
said fluid distributor presenting a fluid inlet, a first primary outlet port, a second primary outlet port, and a secondary outlet port each in direct fluid communication with the fluid distribution chamber when the piston is in the second stage position,
said first primary outlet port, said second primary outlet port, and said secondary outlet port being spaced from one another in a direction corresponding to the direction of shifting of the piston in the main chamber,
said piston operable to substantially terminate direct fluid flow out of the fluid distribution chamber through the secondary outlet port when the piston is in the first stage position.
28. A manifold as claimed in claim 27,
said fluid distributor presenting a sealing surface interposed between the primary and secondary outlet ports,
said sealing surface configured to sealingly contact the piston when the piston is in the first stage position.
29. A manifold as claimed in claim 28,
said fluid distribution chamber defining a volume which is variable by shifting the piston relative to the body.
30. A manifold as claimed in claim 29,
said fluid distributor including a secondary chamber for fluidically coupling the first primary outlet port, the second primary outlet port and the secondary outlet port,
said secondary chamber spaced from the distribution chamber.
31. A manifold as claimed in claim 30; and
a range orifice fluidically coupled to the secondary chamber for metering distribution of a fluid from the manifold.

32. A manifold as claimed in claim 27,
said compression chamber located on the side of the piston generally opposite the distribution chamber.
33. A manifold as claimed in claim 32,
said piston shifted into the first stage position when the distribution chamber is subjected to a distribution pressure which is less than a compression pressure in the compression chamber.
34. A manifold as claimed in claim 33,
said piston shifted into the second stage position when the distribution pressure is greater than the compression pressure.
35. A manifold as claimed in claim 34; and
a compressible fluid disposed in the compression chamber.
36. A manifold as claimed in claim 35; and
a charging valve for adding or removing the compressible fluid to and from the compression chamber.
37. A manifold as claimed in claim 36,
said compressible fluid comprising nitrogen.
38. An apparatus for applying an agricultural fluid to soil, said apparatus comprising:
a pump adapted to increase the pressure of the agricultural fluid;
a dual-stage manifold fluidly coupled to the pump, said manifold comprising
a body defining a main chamber;
a piston disposed in the main chamber and shiftable between a first stage position and a second stage position; and
a fluid distributor sealingly coupled to the body adjacent the main chamber,
said piston dividing the main chamber into a fluid distribution chamber and a compression chamber,
said fluid distribution chamber and said compression chamber being substantially fluidly isolated from one another,
said fluid distributor presenting a fluid inlet, a plurality of primary outlet ports, and a plurality of secondary outlet ports each in direct fluid communication with the fluid distribution chamber when the piston is in the second stage position,
said piston operable to substantially terminate direct fluid flow out of the fluid distribution chamber through said plurality of secondary outlet ports when the piston is in the first stage position,
said fluid distributor defining a plurality of secondary chambers each fluidly coupling one of said plurality of primary outlet ports and a respective one of said plurality of secondary outlet ports, each of said plurality of secondary chambers spaced from the distribution chamber;
a plurality of injection lines each fluidly coupled to a respective one of said plurality of secondary chambers; and
a plurality of terminal orifices each fluidly coupled to a respective one of said plurality of injection lines and operable to discharge the agricultural fluid to the soil.
39. An apparatus as claimed in claim 38,
said fluid distributor presenting a sealing surface interposed between said plurality of primary outlet ports and said plurality of secondary outlet ports,
said sealing surface configured to sealingly contacting the piston when the piston is in the first stage position.

40. An apparatus as claimed in claim 39, said plurality of primary outlet ports and said plurality of secondary outlet ports spaced from one another in a direction corresponding to the direction of shifting of the piston in the main chamber.

41. An apparatus as claimed in claim 40, said fluid distribution chamber defining a volume which is variable by shifting the piston relative to the body.

42. An apparatus as claimed in claim 41; and a plurality of range orifices each fluidically coupled between one of said secondary chambers and a respective one of said plurality of injection lines for metering distribution of a fluid from the manifold.

43. An apparatus as claimed in claim 38, said compression chamber located on the side of the piston generally opposite the distribution chamber.

44. An apparatus as claimed in claim 43, said piston shifted into the first stage position when the distribution chamber is subjected to a distribution pressure which is less than a compression pressure in the compression chamber.

45. An apparatus as claimed in claim 44, said piston shifted into the second stage position when the distribution pressure is greater than the compression pressure.

46. An apparatus as claimed in claim 45; and a compressible fluid disposed in the compression chamber.

47. An apparatus as claimed in claim 38, said plurality of secondary outlet ports in fluid communication with one another when the piston is in the first stage position.

48. An apparatus for distributing an agricultural fluid, said apparatus comprising:

an accumulator defining a first chamber;

a piston shiftably disposed in the first chamber and sealingly contacting the accumulator, said piston fluidly dividing the first chamber into a second chamber and a third chamber; and a manifold coupled to the accumulator proximate the third chamber, said manifold defining an inlet, a first set of outlet ports, and a second set of outlet ports, said manifold including an elevated sealing land surrounding the inlet and the first set of outlet ports, said second set of outlet ports surrounding the sealing land, said piston being shiftable between a first stage position wherein the piston engages the sealing land and a second stage position wherein the piston is spaced from the sealing land, said inlet and said outlet ports directly fluidly communicating with the third chamber when the piston is in the second stage position.

49. An apparatus according to claim 48, said sealing land protruding further toward the piston than the inlet and the outlet ports.

50. An apparatus according to claim 49, said piston substantially sealingly engaging the sealing land when the piston is in the first stage position.

51. An apparatus according to claim 50, said sealing land being generally cylindrical.

52. An apparatus according to claim 48, said manifold further defining a secondary chamber spaced from the third chamber, said secondary chamber fluidly coupled to the first and second sets of outlet ports.

53. An apparatus according to claim 48, and a compressible gas disposed in the second chamber, said compressible gas biasing the piston toward the first stage position, said third chamber containing the agricultural fluid.

54. An apparatus according to claim 53, said compressible gas comprising nitrogen, said agricultural fluid comprising liquid ammonia.

55. An apparatus according to claim 53, and a charging valve for adding the compressible gas to the second chamber.

* * * * *